(12) United States Patent
Brown, Jr. et al.

(10) Patent No.: US 11,960,469 B2
(45) Date of Patent: Apr. 16, 2024

(54) HETEROGENEOUS INTEGRATION WITH DISTRIBUTED LEDGER BLOCKCHAIN SERVICES

(71) Applicant: Deixis, PBC, Seattle, WA (US)

(72) Inventors: Allen L. Brown, Jr., Lake Oswego, OR (US); Patrick J. D. Santos, Kirkland, WA (US)

(73) Assignee: DEIXIS, PBC, Seattle, WA (US)

( * ) Notice: Subject to any disclaimer, the term of this patent is extended or adjusted under 35 U.S.C. 154(b) by 148 days.

(21) Appl. No.: 17/544,880

(22) Filed: Dec. 7, 2021

(65) Prior Publication Data

US 2022/0179841 A1    Jun. 9, 2022

Related U.S. Application Data

(60) Provisional application No. 63/122,403, filed on Dec. 7, 2020.

(51) Int. Cl.
*G06F 16/23* (2019.01)
*G06F 16/25* (2019.01)

(52) U.S. Cl.
CPC ........ *G06F 16/2365* (2019.01); *G06F 16/258* (2019.01)

(58) Field of Classification Search
CPC ............... G06F 16/2365; G06F 16/258; G06F 16/2358; G06F 21/64; H04L 9/50; H04L 63/123
See application file for complete search history.

(56) References Cited

U.S. PATENT DOCUMENTS 10,726,002 B1   7/2020  Srivastava
11,269,859 B1 *  3/2022  Luedtke ............... G06F 16/245
(Continued)

FOREIGN PATENT DOCUMENTS

AU    2020311300 A1 *  3/2022  .......... G06F 16/214
WO       2018089843 A1    5/2018
WO   WO-2020096072 A1 *  5/2020  ............. H04L 63/06

OTHER PUBLICATIONS

System and Method to Support Active Smart Reports for Blockchain Smart Contracts IP.com Electronic Publication Date: Mar. 5, 2018 (Year: 2018).*

(Continued)

*Primary Examiner* — Dennis Truong (57) ABSTRACT

Techniques to leveraging distributed ledgers for integrating heterogeneous database systems independent of underlying legacy systems are described herein. Heterogeneous database systems may be integrated to generate a desired analytics report. In one embodiment, DApps (i.e., smart contracts) and database drivers may be deployed to implement just-in-time data mapping in smart contracts to save substantial time in integrating these heterogeneous database systems. With the smart contract approach, the database drivers may be configured to port only the key data that are needed to be processed based upon, for example, on business considerations. As a result, only data fields that are needed may be mapped and converted into smart contracts. Because the data needed may be dynamically mapped to the inputs specified for the smart contract, which in turn handles posting to the distributed ledgers, changes to the inputs are isolated to the smart contract, rather than forcing a schema redesign.

20 Claims, 6 Drawing Sheets

(56) References Cited

U.S. PATENT DOCUMENTS

| | | | |
|---|---|---|---|
| 11,429,632 B2* | 8/2022 | Gaillardetz | H04L 9/0643 |
| 2017/0228731 A1 | 8/2017 | Sheng et al. | |
| 2018/0204213 A1 | 7/2018 | Zappier et al. | |
| 2018/0330349 A1 | 11/2018 | Uhr et al. | |
| 2019/0130391 A1 | 5/2019 | Wright et al. | |
| 2019/0132350 A1* | 5/2019 | Smith | G06F 21/577 |
| 2019/0171438 A1* | 6/2019 | Franchitti | G06N 20/00 |
| 2020/0142965 A1* | 5/2020 | Weldemariam | G06F 16/27 |
| 2020/0153608 A1 | 5/2020 | Wang | |
| 2020/0160465 A1* | 5/2020 | Spangenberg | G06Q 20/389 |
| 2020/0183950 A1* | 6/2020 | Gaillardetz | G06F 16/258 |
| 2021/0382875 A1* | 12/2021 | Wyner | G06Q 20/3676 |
| 2022/0116201 A1* | 4/2022 | Reddy | H04L 9/0643 |
| 2022/0156249 A1* | 5/2022 | Luedtke | G06F 16/2379 |

OTHER PUBLICATIONS

International Patent Application No. PCT/US2022/062283, International Search Report and Written Opinion dated Mar. 21, 2022, 9 pages.

* cited by examiner

HETEROGENEOUS INTEGRATION WITH DISTRIBUTED LEDGER BLOCKCHAIN SERVICES

CROSS-REFERENCE TO RELATED PATENT APPLICATIONS

This application claims priority to U.S. Provisional Patent Application No. 63/122,403 filed on Dec. 7, 2020, and entitled "Heterogeneous Integration With Block Chain Services" which is hereby incorporated by reference in its entirety.

BACKGROUND

An Information Technology (IT) challenge is integrating the information systems of two or more entities—especially systems providing business analytics, where there may be a need to keep data separate for regulatory compliance, for moving systems to the cloud, for integrating disparate database systems, for integrating systems when one system is "untrusted," or for upgrading legacy database systems, for example and without limitation. Most commonly these systems are heterogeneous, with different platforms and different data formats and data schemas. Despite differences between the systems, IT departments are still expected to be able to generate reports integrating data from heterogeneous systems. For example, if a company with 10,000 stores acquires and integrates 4,000 stores from a different company, the investors will still expect reports from the integrated company.

Star schemas (or equivalent approaches) can be designed to integrate heterogeneous systems. A central database would be populated by the systems to be integrated. However, the central database tables may have to be designed upfront. Furthermore, because changing table designs and their relations may result in updating reports that rely on the original design, IT departments are motivated to "get the schema right," which might call for extensive analysis of immediate reports and additional anticipated reports, for example. However, it may not be possible in some instances to implement the reports until the central database is loaded, and the central database may not be loaded until the schema is fully designed. This approach to integration may result in long lead times and a lengthy integration process.

SUMMARY

Blockchain-based services, a distributed ledger technology, present a cost-effective and time-efficient potential solution. For example, blockchain services and smart contracts can be exploited to provide an advantageous way to integrate heterogeneous systems that simplifies the integration, mitigates risk, reduces cost, and reduces implementation times. In some examples, heterogeneous integration with block chain services can be performed by operations that include:

Identifying an analytics report.
Identifying, from the analytics report, two heterogeneous systems from which to retrieve data.
Identifying a business logic to generate a data set to be posted to blockchain, which may include identifying the desired format for the data on the blockchain.
Installing and configuring drivers for the two heterogeneous systems.
Implementing a provably correct smart contract as a DApp to codify the business logic.
Running the DApp for a predetermined period-of-time.
Running the analytics report.
Validating the analytics report.

A smart contract may be executable code that runs on a decentralized network such as blockchain. In some embodiments described here, a DApp codifies a business logic of how to integrate the heterogeneous systems into smart contracts in the form of a blockchain application. In this disclosure, "DApp" and "smart contract" are used interchangeably unless context dictates otherwise.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Distributed ledgers may be leveraged to integrate heterogeneous database systems independent of underlying legacy systems. Heterogeneous database systems may be integrated, for example, to generate a desired analytics report. In one embodiment, DApps and database drivers may be deployed to implement just-in-time data mapping in smart contracts to save substantial time in integrating these heterogeneous database systems. With the smart contract approach, the database drivers may be configured to port only the key data that are needed to be processed based, for example, upon business considerations. As a result, only data fields that are needed may be mapped and converted into smart contracts. Because the data needed may be dynamically mapped to the inputs specified for the smart contract, which in turn handles posting to the distributed ledgers, changes to the inputs are isolated to the smart contract, rather than forcing a schema redesign. Furthermore, because the analytics are performed only on the data from the distributed ledger, provided that the smart contract is kept consistent, applications or programs that may be used to perform the analytics need not be modified. As a consequence, data reports (or interchangeably referred to herein as a report) of the integrated heterogeneous database systems can be generated from the distributed ledger. This technique of just-in-time data mapping can significantly reduce cost and implementation times, and facilitate effective integration of the heterogeneous database systems of disparate entities, especially those systems that provide business analytics.

In one embodiment, each heterogeneous database system (e.g., billing system, inventory system, etc.) of a particular entity may be paired with a DApp and one or more database drivers to dynamically process data reports for uploading to the distributed ledger. In this embodiment, the deployed database drivers may include an application that converts (maps) legacy database data fields of selected or desired data reports into fields of the smart contracts, pulls data from only those fields in the legacy databases that are needed to generate the desired data reports, and provides that data as inputs to the mapped fields in the smart contracts. In this example, the DApp may then verify authenticity of the data, completeness of exchange conditions for posting, and other preconditions such as a preconfigured time period for posting of the selected data reports from the time of receiving the triggering events. Upon verification, the DApp may post the data to the blockchain for report generation.

Data fields are determined based on the data needed to generate the desired data reports. For example, those data reports that are most urgent, most frequently requested, or most commonly used for business analytics may require data from identifiable data fields. By integrating the data from the data fields of the legacy database(s), a subset of the total number of data reports that might be generated can be generated in a cost-effective and time-efficient manner, and the remaining data reports (i.e., those not desired most urgently) may be generated later. In some examples, the database drivers may enlist in triggering events that are associated with the selected data reports. Upon receiving the triggering events, the database drivers may convert the legacy database data fields of the selected data reports that are associated with the received triggering events and send the converted data reports to the DApp. By the need to normalize all data in the legacy database systems, the deployment of the DApp and the database drivers in integrating heterogeneous database systems may be implemented independent of differences in data formats, programs, or applications of the underlying legacy systems.

Symmetric Asset Exchange

In the case of legal contracts, where one party exchanges an asset (such as a good or service) represented by an artifact for another artifact from a second party, a substantive breach may be determined by confirming performance or receipt of consideration. By deploying the DApps, in conjunction with the blockchain, a party can ensure performance or consideration of the other party prior to the first party's performance or consideration. In this way, the risk of certain classes of damages, such as reliance damages, can be virtually eliminated. Further, the use of blockchain and labeled transition system configuration of the DApp may decompose protocols into binary exchanges, wherein either both parties receive the other's artifacts, or both do not. There is no attempted exchange where one party receives an artifact and the other does not. Since the results of the exchange are the same for both parties, this exchange is symmetric. Since the exchange is of artifacts representing assets, this (sub)protocol is called symmetric asset exchange (SAX).

The labeled transition system in the DApp may include an automatable structure to capture a protocol workflow of a smart contract. In one example, the labeled transition system may include a directed graph comprised of nodes representing states, and directed edges representing valid transitions between the states. A party progresses through the protocol by transitioning from state to state via the edges. In this example, verified transitions in the labeled transition system may be posted to the blockchain.

Example Integration of Heterogeneous Systems Using Blockchain

Figure 1:
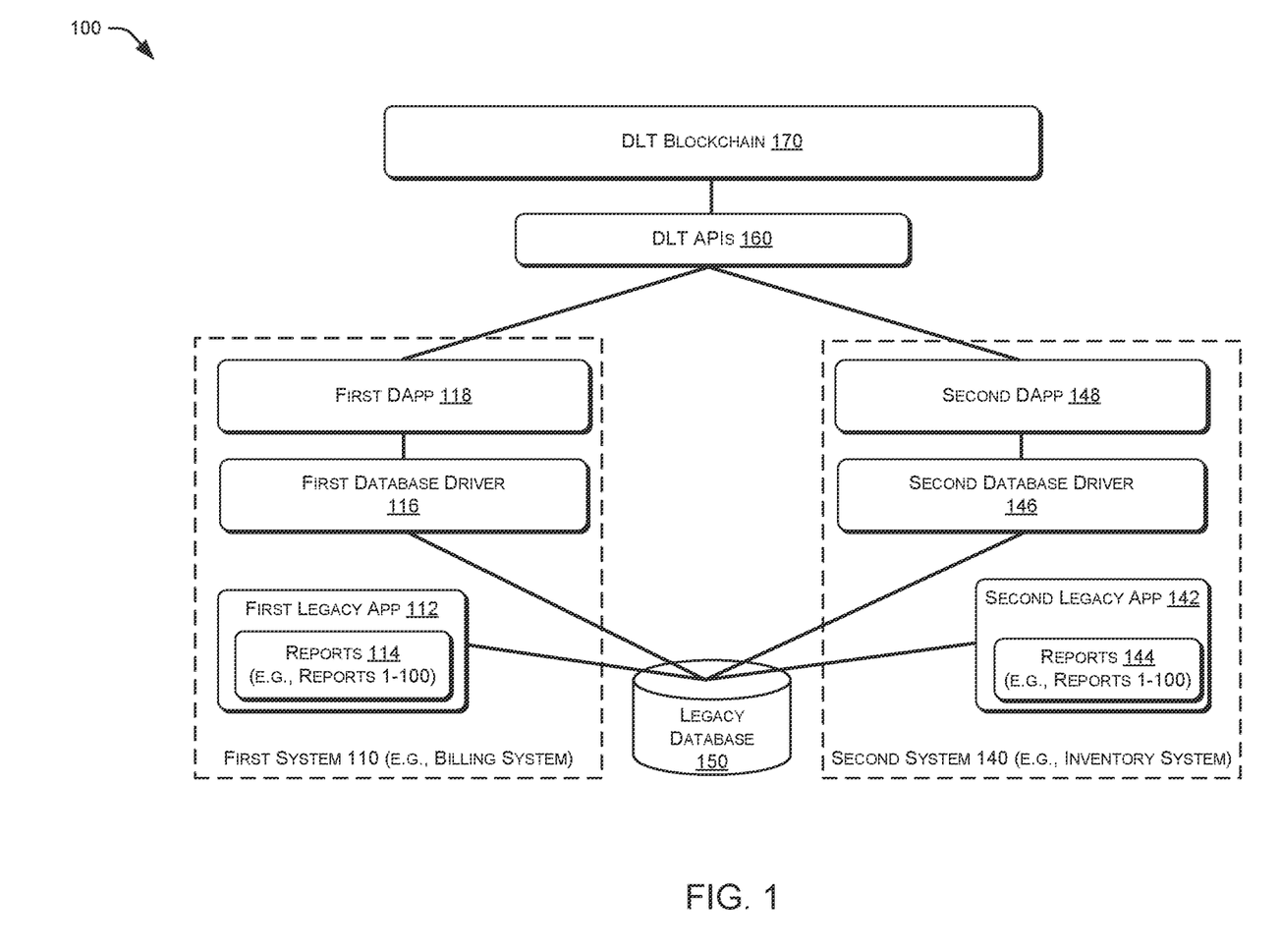
FIG. 1 is a diagram of an example integration of heterogeneous database systems using deployed decentralized applications (DApps) and database drivers.

FIG. 1 is an example block diagram 100 showing integration of heterogeneous database systems via deployed DApps and database drivers. The deployed database drivers may include an application that converts legacy database data fields of dynamically selected data reports into smart contracts. The DApps may include an application that verifies ported data before uploading to a blockchain. Based on this dynamic processing of the selected data reports over a predetermined time period, the blockchain, in conjunction with the deployed DApps and database drivers, may facilitate just-in-time (e.g., runtime) integration of the heterogeneous database systems by data mapping, independent of the underlying legacy systems. As a consequence, the DApps and the database drivers may accelerate integration of the key data from the heterogeneous database systems and avoid the need to normalize all data in the legacy databases. This technique of decoupling from underlying legacy systems and just-in-time integration reduces cost, implementation times, and facilitates effective integration of the databases.

By way of illustration and not limitation, the block diagram 100 may include a first system 110 and a second system 140 that represent a billing system and an inventory system, respectively, of a particular company. The first system 110 may further include a first legacy application (app) 112 that is associated with data reports 114, first database driver 116, and a first DApp 118. The second system 140 may also include second legacy app 142 that is associated with data reports 144, second database driver 146, and a second DApp 148. The heterogeneous first system 110 and second system 140 may be coupled to a legacy database 150 and further connected to distributed ledger technology (DLT) APIs 160. The DLT APIs 160 may facilitate a direct connection to a blockchain 170. In one embodiment, each of the deployed first DApp 118 and second DApp 148 is in consensus with one another under a DLT protocol to guarantee fidelity and security of a record of data, and generate trust without the need for a trusted third party. Further, each of the deployed first DApp 118 and second DApp 148 may be configured to run for a predetermined time period based upon, for example, business requirements or desired analytics reporting.

For purposes of illustration, only two systems (i.e., first system 110 and second system 140) with corresponding DApp and database drivers are shown. However, multiple other deployed systems with corresponding DApp and database drivers may be added without affecting the embodiments described herein.

By way of example and without limitation, first legacy app 112 may include an old method, technology, or computer program of the first system 110. In this example, the first legacy app 112 includes an application for the billing system of the particular company. In this example, the first legacy app 112 may automate the process of collecting payments, sending out of recurring invoices, expense tracking, invoice tracking, and the like. Upon processing particular data, the first legacy app 112 may send the billing data and/or data reports 114 to the legacy database 150. In one example, the database for the billing system may include particular data fields and schema that are different from the data fields and schema of the inventory system, which is represented by the second system 140. Further, by way of illustration and not limitation, the databases of the billing system and the inventory system may be integrated to generate a desired analytics report such as a description of products sold. This analytics report may require data to be pulled from databases of the first system 110 and the second system 140.

First database driver 116 may include hardware, software, or a combination thereof, that may facilitate porting of dynamically selected data reports (e.g., billing system data reports) from the legacy database 150 and send the ported billing system data reports to the first DApp 118. In one embodiment, the first database driver 116 may be configured to enlist in triggering events that can be associated with one or more dynamically selected data reports 114. The dynamic selection of the data reports may be based, for example, upon one or more features of the data reports such as frequency of use, timestamps, etc.

In one embodiment, the first database driver 116 may use codes to convert the data fields of the selected data reports, which are associated with received triggering events, into smart contracts, e.g., at runtime or on demand (just-in-time). By implementing this just-in-time data mapping, the first database driver 116 may facilitate the integration of the first system 110 with the second system 140 independent of their respective underlying legacy systems.

First DApp 118 may include hardware, software, or a combination thereof, that implement a business logic to verify and process selected data that were ported by the first database driver 116. The business logic may include a program for authenticating requests, monitoring the completion of conditions, and the like. For example, ported data may include a sale of a widget and adding the consideration of the sale in the billing system that is represented by the first system 110. In this example, the completion of conditions may include verification of deducted inventory for the number of widgets in the inventory system that is represented by the second system 140 as a result of the sale. In one embodiment, the first DApp 118 may codify the business logic on how to arbitrate which system to trust, when to trust it, and how to post results in the DLT blockchain 170. The first DApp 118 may be configured to run for a predetermined time period such as every other minute or at any other time interval as may be required for generating the desired analytics report. The resulting data posted in the blockchain 170 may then be used as references or sources for generating the analytics report or other business analytics.

In some embodiments, the first DApp 118 may use a labeled transition system for verification of the dynamically selected data reports that were ported by the first database driver 116 from the legacy database 150. The labeled transition system may include an automatable structure to capture a protocol workflow of a smart contract. In one example, the labeled transition system may include a directed graph comprised of nodes representing states, and directed edges representing valid transitions between the states. A party progresses through the protocol by transitioning from state to state via the edges. In this example, verified transitions in the labeled transition system may be posted to the blockchain 170.

Legacy database 150 may include a database that stores legacy data of a particular organization such as the company that runs the billing system and the inventory system. In one example, the legacy database 150 may include a group of heterogeneous databases that combines different kinds of data systems, such as relational or object-oriented databases, hierarchical databases, network databases, multimedia databases, spreadsheets, or filesystems. The heterogeneous database systems may include different information systems, platforms, data schemas, data formats, or configurations.

In one embodiment, the legacy database 150 may support a publish and subscribe pattern where the legacy database 150 sends triggering events to subscriber database drivers. In this embodiment, the sending of the triggering events may be based upon the subscriptions made by the first database driver 116 and the second database driver 146. In some cases, the sending of the triggering events may be performed over a predetermined time period after an updating of the legacy database 150. In this case, the first DApp 118 or the second DApp 148 may have a configured time period to receive the ported data from the time of the receiving of the triggering events by the database drivers.

DLT APIs 160 may include one or more interfaces that communicate with a blockchain node in the blockchain 170 and facilitate communications between the deployed systems (e.g., first system 110 and second system 120) and the blockchain 170. The blockchain 170 may include blockchain nodes that can record digitally generated and immutable transactions. Each blockchain node may store a record of an event, which can be compared to the consensus of other blockchain nodes. Since the network of blockchain nodes establishes a trust and verification system without a single, central authority, the blockchain nodes may provide a powerful system for decentralized systems that may request secure verification without dependence on a single blockchain node.

By way of example and without limitation, second legacy app 142 may include an old method, technology, or computer program of a separate system such as, for example, the inventory system that is represented by the second system 140. The second legacy app 142 may automate the process of tracking inventory levels, orders, sales, and deliveries. Upon processing of the inventory data, the second legacy app 142 may send the inventory data and/or data reports 144 to the legacy database 150. In one example, the database for the inventory system may include data fields and schema that are different from the data fields and schema of the billing system that is represented by the first system 110.

The second database driver 146 may include hardware, software, or a combination thereof, that may facilitate porting of dynamically selected data (e.g., inventory system data), which may include data reports, from the legacy database 150 and send the ported billing system data to the second DApp 148. In one embodiment, the second database driver 146 may be configured to enlist in triggering events that can be associated with selected inventory system data or a portion thereof. The dynamic selection of the data reports may be based, for example, upon the frequency of use or other features of the inventory system data reports.

In one embodiment, the second database driver 146 may use code to convert the data fields for the selected data that are associated with the received triggering events into the fields of the smart contracts. This can be done at runtime. By implementing this just-in-time mapping, the second database driver 146 may facilitate the integration of the second system 140 with the first system 110 independent of the underlying legacy systems.

The second DApp 148 may include hardware, software, or a combination thereof, that stores a business logic for verifying and processing selected data that were ported by the second database driver 146 from the legacy database 150. The business logic may include program code for authenticating requests, monitoring the completion of conditions, and the like. For example, ported data may indicate a reduction in number of widgets in inventory due to a sale. In this example, the completion of conditions may include verification of the sale in the first system 110 corresponding to the inventory deduction in the number of widgets in the inventory system that is represented by the second system 140 as a result of the sale. The second DApp 148 may codify the business logic on how to arbitrate which system to trust, when to trust it, and how to post results in the blockchain 170. The results posted in the blockchain 170 may then be used as references or sources for business analytics. In one embodiment, the first DApp 118 and second DApp 148 may be configured to adapt the same configuration in following the DLT protocol to guarantee fidelity and security of the record of data and generate trust without the need for a trusted third party.

In some embodiments, the second DApp 148 may use the labeled transition system for verification of the dynamically selected inventory system data that were ported by the second database driver 146 from the legacy database 150. The labeled transition system may include an automatable structure to capture a protocol workflow of a smart contract. In one example, the labeled transition system may include a directed graph comprised of nodes representing states, and directed edges representing valid transitions between the states. A party progresses through the protocol by transitioning from state to state via the edges. In this example, verified transitions in the labeled transition system may be posted to the blockchain 170

By way of illustration and not limitation, multiple deployed systems such as billing systems, inventory systems, employee benefits systems, etc. may include corresponding DApps and database drivers to facilitate the integration of two or more heterogeneous database systems and without dependence on data schemas, configurations, technology, etc. of the underlying legacy systems. The DApps and the database drivers, in conjunction with existing features of the blockchain technology, may facilitate moving of systems to the cloud, integrating disparate database systems, integrating systems when one system is "untrusted," and upgrading of legacy systems.

In an embodiment, each of the first database driver 116 and the second database driver 146 may be configured to implement a publish and subscribe pattern wherein each database driver can enlist in selected legacy events in the legacy database 150. In this embodiment, each of the first database driver 116 and the second database driver 146 may be configured to enlist in one or more legacy events that are associated with the reports 114 and 144, respectively. By dynamically selecting random data reports based upon business considerations, for example, each of the first database driver 116 and the second database driver 146 may be able to port data reports without regard to other data reports that have been uploaded, processed, or yet to be processed.

In one embodiment, the selecting of the legacy events to be ported or processed by the first database driver 116 and the second database driver 146 may be based on one or more features of the report 114 or 144, respectively. The one or more features may include, by way of illustration and not limitation, a number of processing that has been performed on the data or report, timestamps of the report, completeness, accuracy, and other similar data features. In this embodiment, the first database driver 116 or the second database driver 146 may use stored thresholds to dynamically select the one or more reports from the legacy database 150 to convert into smart contracts. The stored thresholds may correspond to the features of the data reports 114 or 144.

For example, a number of processing thresholds may be used to dynamically select the data reports based upon their frequency of use within a particular time period. In another example, a timestamp threshold may be used to identify the reports based upon their associated timestamps, and so on. In these examples, the first database driver 116 may be configured to perform the dynamic selection of the data reports based on business considerations and decoupled from underlying legacy systems of the first system 110. In an embodiment, the second database driver 146 may be configured to perform similar functions as that of the first database driver 116 as described.

Referencing FIG. 1, and for a particular first predetermined time period, the first database driver 116 may be configured to select and subscribe to a portion of the report 114 such as (data) reports 114(1)-114(10) of total reports 114(1)-114(100). In this example, the first database driver 116 may select and use a threshold to identify the reports 114(1)-114(10) out of the 100 reports. Within the first predetermined time period, the first database driver 116 may limit the data reports that it may process to the selected reports only e.g., reports 114(1)-114(10). Thereafter, and for a second predetermined time period, the first database driver 116 may port another set of reports such as reports 114(5)-114(50) of the 100 reports. This dynamic selection of the data reports to be processed may avoid normalization of the legacy databases for purposes of integrating heterogeneous database systems.

In the preceding example, and upon receiving of the one or more triggering events, the first database driver 116 may query for data from the legacy database 150. For example, the first database driver 116 may run a SQL query to a relational database to determine the data that are associated with the received triggering event. In this example, the first database driver 116 may retrieve the associated data and send the retrieved data for further processing by the first DApp 118, such as converting the data fields from the legacy database 150 into smart contracts.

In one embodiment, the first DApp 118 may verify the received data from the first database driver 116. Further, the first DApp 118 may include a business logic that facilitates the generation of a dataset to be posted to the blockchain 170. The business logic may identify a format of the data on the blockchain 170 and then adapt an identified form when uploading the dataset in the blockchain to implement consistency. As long as the uploaded data are consistent, the first DApp 118 may dynamically process is able to process the retrieved data without the need of normalizing the data.

In one embodiment, the first DApp 118 may use the business logic to implement the just-in-time smart contract. Further, the first DApp 118 may authenticate sources of the ported data, validate data fields of the ported data, and determine compliance with other preconditions for processing the queried data. The compliance with other preconditions may include, for example, querying the legacy database within a particular period of time from the receiving of the triggering event. The other preconditions may also include contract exchange conditions where the DApp 118 validates the contract upon verification of the delivery and payment of consideration by parties to a contract.

Upon verification and validation of the ported data, the first DApp 118 may post the verified data to the blockchain 170. For example, the first DApp 118 may post the verified data to the blockchain 170 using the identified schema defined in the blockchain 170. In this example, the first system 110 and the second system 140 may not share the same data format and configurations under the DLT protocol to guarantee fidelity and security of the record of the uploaded data in the blockchain 170, yet the smart contract receives the data in a format required for the blockchain 170.

In some embodiments, selecting of for subsequent data reports may be predetermined to be implemented periodically. For example, the first database driver 116 may the legacy database 150 every other day for data requested for additional reports. In this example, the predetermined time period for retrieving requested data may be different for some reports than for others.

Referencing the second system 140, the second database driver 146 and the second DApp 148 may implement substantially similar functions and operations as those described for the first database driver 116 and first DApp 118, respectively. That is, the second database driver 146 may similarly use thresholds to select one or more inventory data reports from the data reports 144 to process. Then, the second database driver 146 may enlist on triggering events from the legacy database 150 triggers. Thereafter, the second database driver 146 may query the legacy database 150 for the data that are associated with the triggering events. In one embodiment, the second DApp 148 may receive the ported data from the second database driver 146 associated with fields converted by the second database driver 246 to fields of the smart contracts. In this embodiment, the second DApp 148, similarly to the first DApp 118, may perform validation and verification before uploading the verified data to the blockchain 170 with association to the appropriate fields.

In one embodiment, the second DApp 148 may be configured to adapt the same data format as that of the first DApp 118 to maintain consistency of the data fields for the data to be uploaded to the blockchain 170. In this embodiment, the first DApp 118 and the second DApp 148 may for posting to the blockchain 170 without normalizing the data from the selected reports. This technique may accelerate the integration of key data between merging systems.

In certain embodiments, each of the first DApp 118 and the second DApp 148 may implement the SAX and just-in-time data mapping in smart contracts. This approach may save substantial time in integrating the heterogeneous database systems. With the smart contract approach, the first database driver 116 and the second database driver 146 may be configured to pull only the key data or the selected data reports that are needed to be processed based upon business considerations. As a result, only data fields of the selected data reports that are needed may be mapped. Furthermore, because the data needed are mapped to the inputs specified for the DApp, which in turn handles posting to the blockchain 170, changes to the inputs are isolated to the DApp, rather than forcing a schema redesign for data stored by the (disparate) first system 110 and second system 140, or for data stored with disparate schema in different legacy databases, as discussed below with reference to FIG. 2. Further, because the analytics are performed only on the blockchain 170 data, provided that the fields in the schema of the smart contract or DApp is kept consistent, the programs (not shown) that perform the analytics need not be modified, nor is normalization of the disparate databases necessary. As a consequence, data reports can be generated from the blockchain 170 in a time-efficient and cost-effective manner.

The SAX implementation may facilitate determination of which report offers are exchange conditions for each other. Upon determining the satisfaction of the exchange conditions, the first DApp 118 or the second DApp 148 may post the verified data to the blockchain 170. In this way, the consensus from the blockchain 170 may provide consensus on the first system 110 and the second system 140, which in turn enables symmetric exchange conditions. SAX is described in further detail in the applicant's Non-Provisional Patent Application, "Anonymous Distributed Consensus Regarding the Verification of Protocols" application Ser. No. 16/526,872, which is incorporated herein by reference.

In alternative embodiments, the database drivers may be configured to post directly to the blockchain 170. In these embodiments, the database drivers may be configured to perform the verification and validation of the ported data reports from the legacy database 150.

Figure 2:
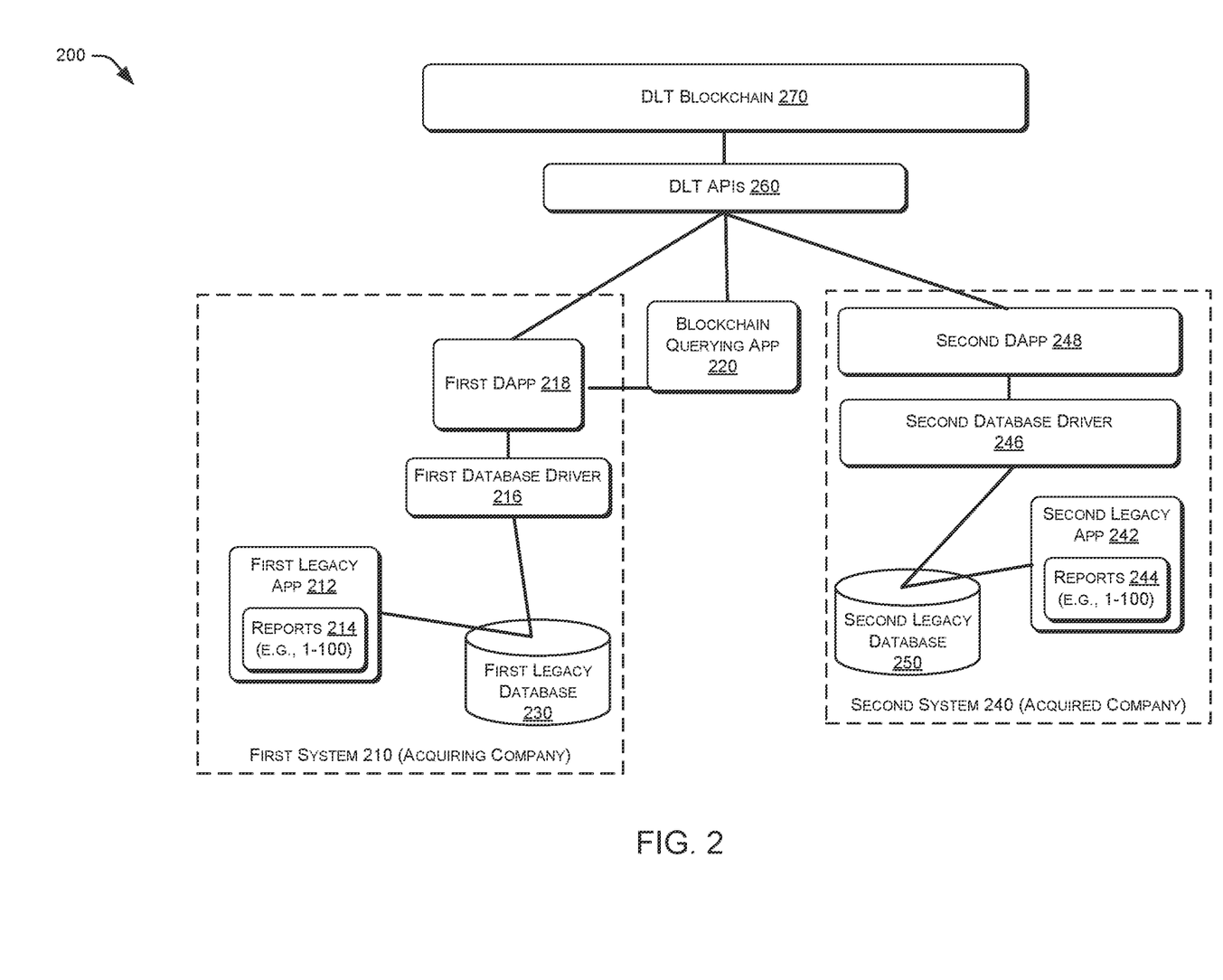
FIG. 2 is a diagram of another example integration of the heterogeneous database systems via the deployed DApps and the database drivers.

Example Integration of Heterogeneous Systems That Uses Different Legacy Databases FIG. 2 is an example block diagram 200 showing integration of heterogeneous database systems via deployed DApps and database drivers. FIG. 2 represents only one example showing inventive concepts described herein, and is not to be considered limiting of such concepts.

Block diagram 200 illustrates a merging of heterogeneous database systems to generate the desired analytics report. In this example, heterogeneous database systems are correspondingly owned by separate companies and each company further includes a separate legacy database. In comparison with block diagram 100 of FIG. 1 as described above, block diagram 200 includes separate legacy databases for each of the heterogeneous database systems while block diagram 100 utilizes only one legacy database (i.e., legacy database 150) shared by the first system 110 and the second system 140.

In one embodiment, each of the heterogeneous database systems may deploy database drivers to convert legacy database data fields of data for dynamically client-selected data reports into smart contracts. However, for a particular DApp of a particular system to perform verification of the ported data, an additional module such as a blockchain querying app may be deployed to communicate and query directly the DLT blockchain. In response to querying of the DLT blockchain by the blockchain querying app, the requesting system (e.g., acquiring company) may receive notifications of the data that were uploaded by the other system (e.g., acquired company). The requesting system may then use the notifications to perform the verification of the ported data before uploading to the blockchain. By dynamically selecting the data to be processed (e.g., for a particular time period), the blockchain, in conjunction with the deployed DApps and database drivers, may facilitate just-in-time integration of the heterogeneous database systems independent of the underlying legacy systems.

By way of illustration and not limitation, block diagram 200 may include a first system 210 and a second system 240 that represent systems of an acquiring company and a company to be acquired, respectively. The first system 210 may further include a first legacy app 212 that is associated with data reports 214, first database driver 216, first DApp 218, and first legacy database 230. A blockchain querying app 220 may be part of the first system 210 or external thereto. The second system 240 may also include a second legacy app 242 that is associated with data reports 244, second database driver 246, second DApp 248, and second legacy database 250. The heterogeneous first system 210 and second system 240 may be coupled to one or more DLT APIs 260. The DLT APIs 260 may facilitate a direct connection to a blockchain 270.

The first legacy app 212, data reports 214, first database driver 216, first DApp 218, second legacy app 242, data reports 244, second database driver 246, and the second DApp 248 correspond to the first legacy app 112, data reports 114, first database driver 116, first DApp 118, second legacy app 142, data reports 144, second database driver 146, and the second DApp 148, respectively, of FIG. 1. Similarly, the DLT APIs 260 and the blockchain 270 correspond to the DLT APIs 160 and the blockchain 170, respectively, of FIG. 1. Each of these components in block diagram 200 may perform similar functions and operations as described above.

First legacy database 230 may include a database that stores legacy data of the acquiring company, which is represented by the first system 210. In one example, the first legacy database 230 may include a group of heterogeneous databases that combines different kinds of data systems, such as relational or object-oriented databases, hierarchical databases, network databases, multimedia databases, spreadsheets, or filesystems. The heterogeneous database systems may include different information systems, platforms, data schemas, data formats, or configurations.

In one embodiment, the first legacy database 230 may support a publish and subscribe pattern where the first legacy database 230 sends triggering events to subscriber—first database driver 216. In this embodiment, the sending of the triggering events may be based upon the subscriptions made by the first database driver 216.

Blockchain querying app 220 may include an application that sends direct queries to the blockchain 270. In one embodiment, the direct queries are implemented to support the first DApp 218 in verifying the ported data. Because the first DApp 218 is not directly connected to the second legacy database 250, the first DApp 218 may use the direct queries to obtain necessary information for verification and validation of the ported selected data from the first legacy database 230. Upon verification and validation of data similar to verification as described in FIG. 1 above, the first DApp 218 may upload the data to the blockchain 270.

In one embodiment, the first system 210 may leverage the blockchain 270 to integrate the second system 240 with its database independent of the underlying legacy systems. In this embodiment, the first system 210 may use the first database driver 216, first DApp 218, and the blockchain querying app 220 to dynamically select the data to process on account of the integration of the two heterogeneous database systems. For example, the first database driver 216 may dynamically port selected data from the first legacy database 230 and send the ported data to the first DApp 218.

Upon receiving of the ported data, the first DApp 218 may send a triggering signal or request signal to the blockchain querying app 220 to send the direct queries to the blockchain 270. In one embodiment, the direct queries may relate to the uploaded data that may be required to verify or validate the received ported data in the first DApp 218. Upon receiving of the notification (not shown) from the blockchain 270, the first DApp 218 may use information associated with the notification to perform the verification and validation of the ported data. The information, for example, may include a performance of a condition by another system, etc. In this example, the first DApp 218 may use SAX to verify the completion of contracts as described herein.

Figure 3:
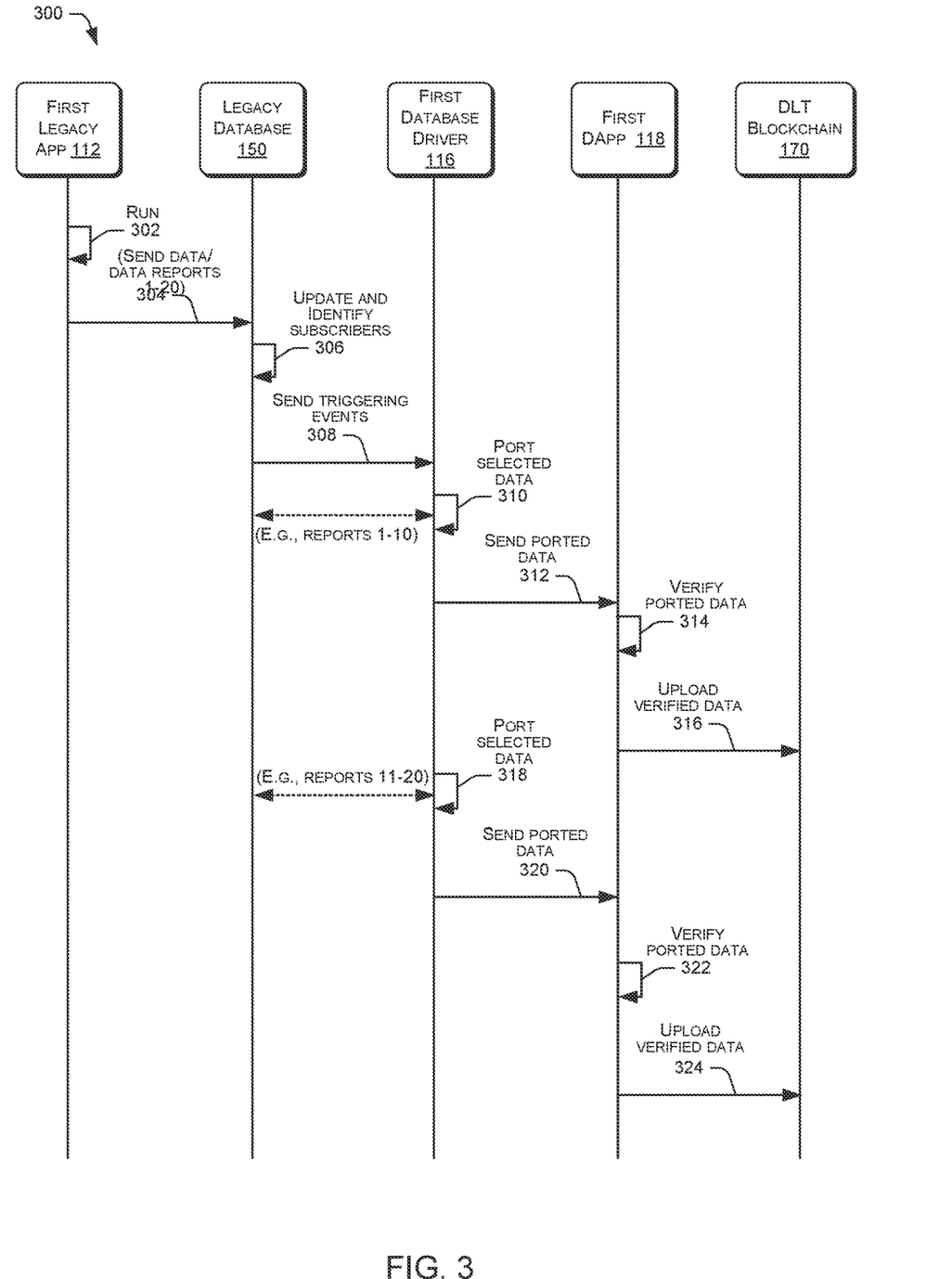
FIG. 3 is an example sequence diagram that depicts a methodological implementation of a technique for integrating heterogeneous database systems independent of underlying legacy systems.

Example Sequence Diagram for Dynamic Integration of Heterogeneous Database Systems Via Distributed Ledgers FIG. 3 is a sequence diagram 300 that depicts a methodological implementation of a technique for integrating heterogeneous database systems independent of the underlying legacy systems. In the following discussion of FIG. 3, continuing reference is made to the elements and reference numerals shown in and described with respect to the first DApp 118 and first database driver 116 in FIG. 1. A similar flow applies to the second DApp 148 and second database driver 146 in FIG. 2. Further, certain operations may be ascribed to particular system elements shown in previous figures. However, alternative implementations may execute certain operations in conjunction with or wholly within a different element or component of the system(s). To the extent that certain operations are described in a particular order, it is noted that some operations may be implemented in a different order to produce similar results.

By way of illustration and not limitation, the first legacy app 112 may run 302 its program and thereafter send data and/or data reports 304 to the legacy database 150. The data and/or data reports 304, for example, may relate to data reports 1-20, or a total of 20 data reports, in this embodiment. In other embodiments, data sent to the legacy database 150 may be data collected without inclusion in an immediate report, but stored in the legacy database with an association to fields may in turn be associated with corresponding fields. In response to the received data and/or data reports, the legacy database 150 may perform an update and identify subscribers 306 that enlisted in the legacy database triggers (for example, the first database driver 116 enlisted in these legacy database triggers that are associated with the received data or data reports 1-20). In this example, the legacy database 150 may send triggering events 308 to the first database driver 116. The triggering events may be associated with reports 1-20.

Upon receiving of the triggering events, the first database driver 116 may port selected data 310 that may relate to a portion of the data reports 1-20. For example, the first database driver 116 may port only data related to the data reports 1-10 (or the data reports themselves) of the 20 data reports. In this example, the first database driver 116 may convert the data fields of the data/data reports 1-10 and send ported data 312 to the first DApp 118. The first DApp 118 may then verify ported data 314 and thereafter upload verified data 316 to the blockchain 170 after verification. In one embodiment, a predetermined time between receiving of the triggering events by the first database driver 116 and the sending of ported data 312 may be implemented as one of the preconditions in verifying the ported data by the first DApp 118. In this embodiment, the first DApp 118 may also be configured to run for a predetermined time period before the next dataset of selected data reports are ported by the first database driver 116.

For example, and after the initial uploading of the verified data (upload verified data 316), the first database driver 116 may port selected data 318 such as the data reports 11-20. The first DApp 118 may verify ported data 322 and perform an upload of verified data 324 to the blockchain 170 after verification. In some embodiments, the first database driver 116 may port data reports as may be required by the analytics report. For example, the first database driver 116 may select again data reports 1-10 and some of the data reports 11-20. By dynamically selecting the data reports to process, the process of integrating the heterogeneous database systems may not require data normalization.

Figure 4:
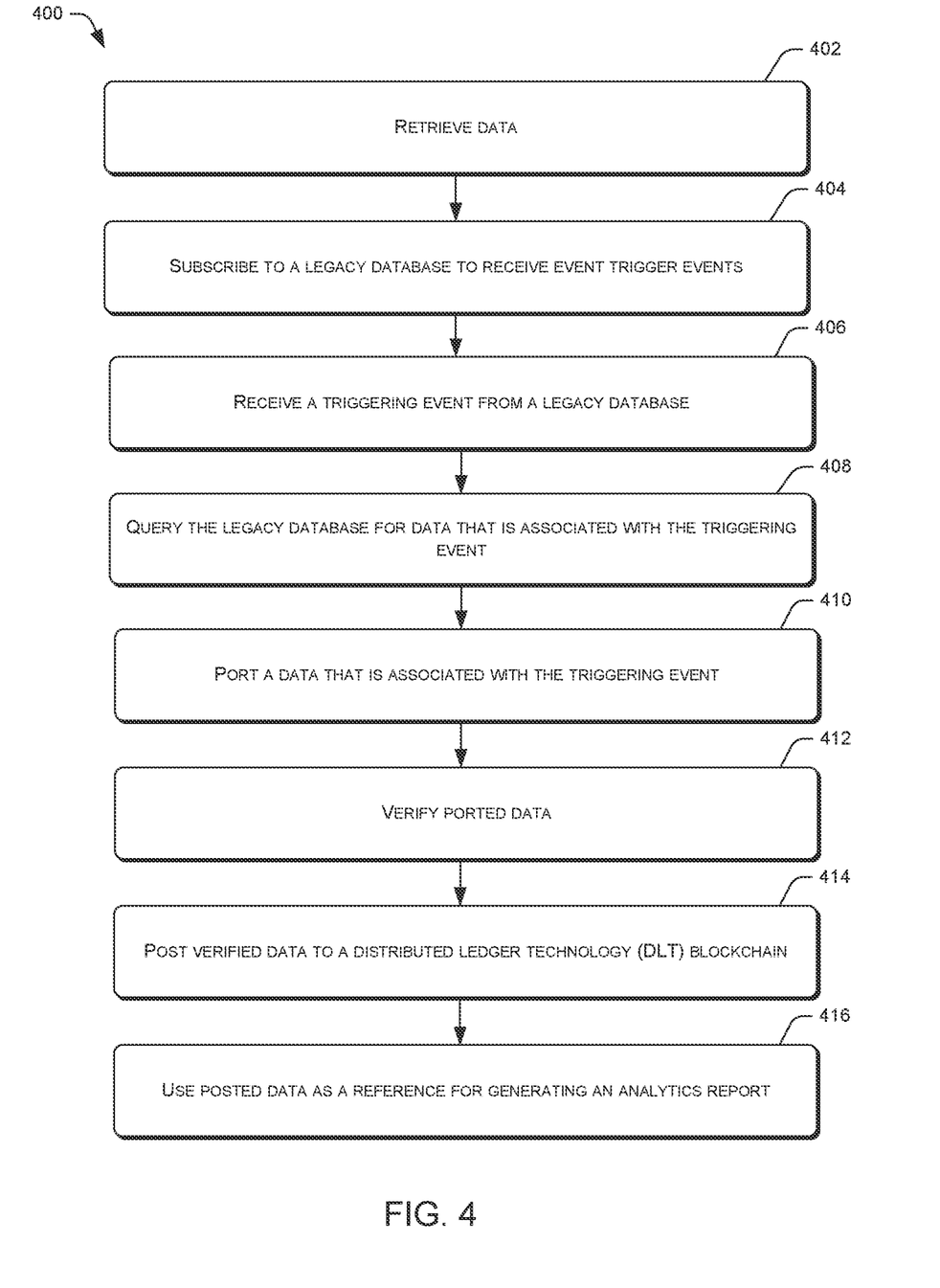
FIG. 4 illustrates a methodological implementation of a technique for integrating heterogeneous database systems independent of the underlying legacy systems.

Example Implementation of Integrating Heterogeneous Database Systems Via Distributed Ledgers FIG. 4 is a flow diagram 400 that depicts a methodological implementation of a technique for integrating heterogeneous database systems independent of the underlying legacy systems. In the following discussion of FIG. 4, continuing reference is made to the elements and reference numerals shown in and described with respect to the DApps and database driver components in FIG. 1. Further, certain operations may be ascribed to particular system elements shown in previous figures. However, alternative implementations may execute certain operations in conjunction with or wholly within a different element or component of the system(s). To the extent that certain operations are described in a particular order, it is noted that some operations may be implemented in a different order to produce similar results. Furthermore, one or more blocks may be omitted or performed as part of a separate process.

A specific, non-limiting example, of one or more processes described herein may be implemented in a merger or acquisition where there is a need to keep data separate for regulatory compliance, for moving systems to the cloud, for integrating disparate database systems, for integrating systems when one system is "untrusted," or for upgrading legacy database systems. An example of one of the regulatory compliance cases is during a merger waiting period where Federal Trade Commission (FTC) may limit coordination between the merging parties. Substantial fines can be imposed for violations of "gun jumping." In this regard, the leveraging of the blockchain, in conjunction with the deployment of the DApp and database drivers, may mitigate the risk of incurring these fines while providing the data that IT is pressured to provide to the company.

At block 402, the database driver may select one or more of data (which may include data reports) from a a particular heterogeneous database system in response to a demand by a client, not shown, for data to prepare data reports. In one example, the data may be required for a particular analytics report. In this example, the database driver such as the first database driver 116 may retrieve data to process. In one embodiment, the data may be associated with one or more features that can include a number processing performed on the report, timestamps of the report, completeness, accuracy, and similar data features. In this embodiment, the database driver may use preconfigured thresholds to select the one or more reports. For example, each of the thresholds may correspond to a feature in the report, such as a time range, product identifier, etc.

At block 404, the database driver may subscribe to the legacy database to receive legacy event triggers that are associated with the data. For example, the first database driver 116 may be configured to implement a publish and subscribe pattern where the database driver can subscribe to receive triggering events that are associated with a set of reports. In one example, the first database driver 116 may receive the legacy event triggers upon updating the legacy database, for example in response to receiving new data.

At block 406, the database driver may receive a triggering event from a legacy database. For example, the legacy database 150 is updated and in response to the updating, the legacy database sends triggering events to the first database driver 116.

At block 408, the database driver may query the legacy database for data that is associated with the triggering event. For example, the first database driver 116 may query the legacy database 150 based on a received triggering event in block 406.

At block 410, the database driver may port a selected data that is associated with the triggering event. For example, the first database driver 116 may port data related to the reports 114. In this example, the first database driver 116 may be configured to convert data fields of selected reports 114(1)-114(10) into smart contracts.

At block 412, the DApp may verify the ported data from the database driver. In one example, the DApp may implement a business logic that generates a dataset to be uploaded and posted in the blockchain 170. The business logic may identify, for example, the format of the dataset on the blockchain and adapt the identified format to implement consistency in the fields associated with the uploaded data. In another example, the DApp may use the business logic to verify the ported data. The verification may include authenticating the ported data, verifying its source, and other preconditions that may be required by the analytics report. The preconditions, for example, may include processing of the data within a particular period of time from the receiving of the triggering event, checking the date of the updating of the legacy database, and the like.

At block 414, the DApp may upload and post the verified data to the blockchain. For example, the first DApp 118 may upload and post the verified data to the blockchain 170 using the preconfigured data format to maintain consistency in the uploaded data in the blockchain.

At block 416, the posted data in the blockchain may be used as a reference for generating an analytics report. For example, the analytics report may include a description of products sold over a time period. In this example, the analytics report may require different datasets from the heterogeneous database systems as described above.

Example Implementation of Selecting of Reports

Figure 5:
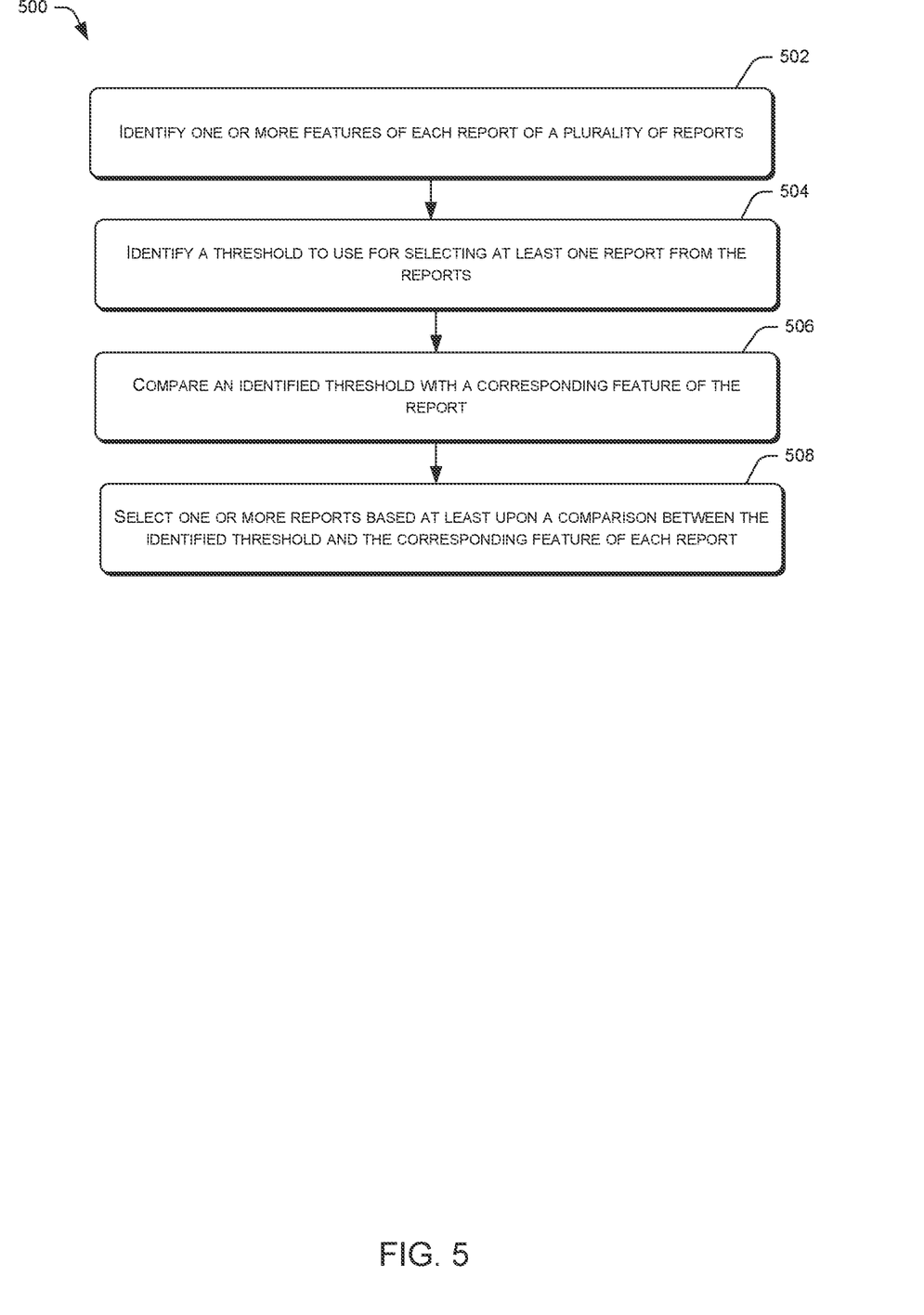
FIG. 5 illustrates a methodological implementation of a technique for selecting one or more (data) reports from a set of reports to be ported by the database driver.

FIG. 5 is a flow diagram 500 that depicts a methodological implementation of a technique for selecting the reports from the set of reports to be ported by the database driver. In the following discussion of FIG. 5, continuing reference is made to the elements and reference numerals shown in and described with respect to the DApp and database driver components. Further, certain operations may be ascribed to particular system elements shown in the figures. However, alternative implementations may execute certain operations in conjunction with or wholly within a different element or component of the system(s). To the extent that certain operations are described in a particular order, it is noted that some operations may be implemented in a different order to produce similar results. Furthermore, one or more blocks may be omitted or performed as part of a separate process.

At block 502, the database driver may identify one or more features of each report of a set of reports in a legacy database. For example, each of the reports 114 may be associated with features that include number processing performed on the report, timestamps of the report, completeness, accuracy, and similar data features. In this example, the first database driver 116 may be preconfigured to use stored thresholds corresponding to each of these features. For example, the number of processing thresholds may include a value that indicates the frequency of porting the reports, etc.

At block 504, the database driver may identify a threshold to use for selecting one or more reports from the set of reports. For example, a server database may store thresholds corresponding to the one or more features of the reports. In this example, the stored thresholds may be used to select the one or more reports from the set of reports to be ported by the first database driver 116.

At block 506, the database driver may compare an identified threshold with a corresponding feature of the reports.

For example, the first database driver 116 is preconfigured to use a frequency threshold to identify the reports that were frequently used within a particular period of time.

At block 508, the database driver may select one or more reports based at least upon a comparison between the identified threshold and the corresponding feature of the report. In one embodiment, the first database driver 116 may select at will the reports that it can process for sending to the DApp. The selection may be independent from other reports that have been processed or have not been processed at all. In this regard, there is no need for a master star schema to be designed.

Example System Server

Figure 6:
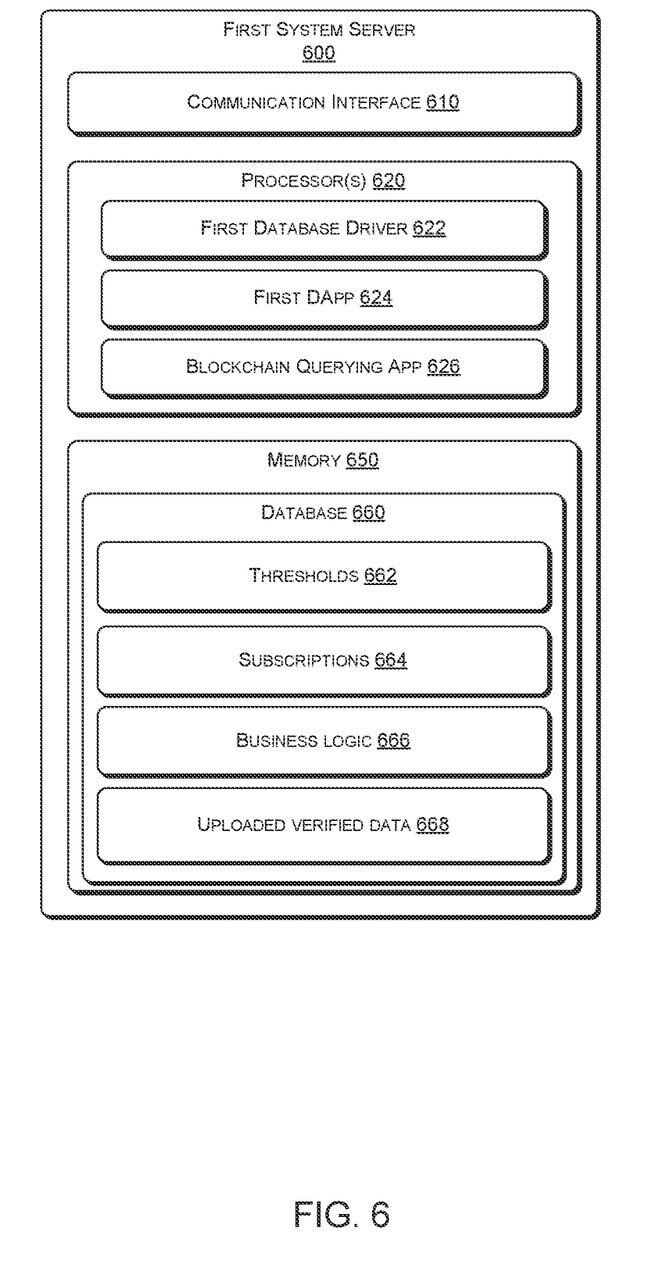
FIG. 6 is an example block diagram of a heterogeneous system server.

FIG. 6 is a block diagram of an example first system server 600 that may implement integration of heterogeneous database systems independent of underlying legacy systems. Heterogeneous database systems may be integrated, for example, to generate the desired analytics report. As shown, the first system server 600 may include a communication interface 610, one or more processors 620, and a memory 650. Processors 620 may implement a first database driver 622, a first DApp 624, and a blockchain querying app 626. The memory 650 may include a database 660 that further includes thresholds 662, subscriptions 664, business logic 666, and uploaded verified data 668.

In one example, the first system server 600 may establish communications with the blockchain 170 and other heterogeneous systems through the communication interface 600. The communication interface 600 may include hardware, software, or a combination of hardware and software that transmits and/or receives data from another database system such as the second system 140. Communication interface 600 may include a transceiver that facilitates wired or wireless communications through a cellular network or the broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), etc.

Processor(s) 620 may be a central processing unit(s) (CPU), graphics processing unit(s) (GPU), both a CPU and GPU, or any other sort of processing unit(s). Each of the one or more processor(s) 620 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 620 may also be responsible for executing all computer applications stored in the memory, which can be associated with common types of volatile (RAM) and/or non-volatile (ROM) memory. For example, the processor(s) 620 may process data information that the first system server 600 receives through the communication interface 600. In another example, the processor(s) 620 may use the communication interface 600 to send the notifications to the other systems in a heterogeneous system environment.

The first database driver 622, first DApp 624, and the blockchain querying app 626 may correspond to the first database driver 116, first DApp 118, and the blockchain querying app 220 as described in FIG. 1 or FIG. 2.

Memory 650 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 650 may also include a firewall. In some embodiment, the firewall may be implemented as hardware in the first system server 600.

Database 660 may store data information, historical data, and other information that can be collected from a particular system or another system. The thresholds 662 may store threshold values that may be used by the first database driver 622 to select one or more reports from a set of reports. The subscriptions 664 may include triggering events that the first database driver 622 enlisted to receive. The business logic 666 may implement just-in-time contract, identify a format of the data on the DLT blockchain, generate a dataset to be posted to the blockchain based upon an identified format of the data, and authenticate a completion of conditions and preconditions that are required for generating the analytics report.

Embodiments described herein demonstrate the isolation and encapsulation of integration logic within a smart contract, and also demonstrate cost and time-to-implement savings. In particular this description shows that analytics reports can be developed in parallel and independent of analysis to integrate/migrate data from multiple reports, the time-to-develop can be reduced in view of retrieving and integrating a reduced set of data needed for the analytics report, and a cost saving commensurate with the savings for time-to-develop.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable storage media storing computer-executable instructions that upon execution cause one or more computers to collectively perform acts comprising:

selecting, by a database driver, at least one report from a plurality of reports based on one or more features of the at least one report;

subscribing, by the database driver, to a legacy event trigger that is associated with the selected at least one report;

receiving a triggering event from a legacy database;

in response to receiving the triggering event, querying the legacy database for data to include in identifiable data fields of the legacy database in the selected report that are predetermined to receive the data;

mapping the data fields into data fields of a smart contract;

porting, by the database driver, the data that is associated with the triggering event as inputs to the mapped fields of the smart contract;

verifying, by a decentralized application (DApp), the ported data; and posting, by the DApp, the verified data to a distributed ledger technology.

2. The one or more non-transitory computer-readable storage media of claim 1, wherein the reports are associated with a heterogeneous database system that is integrated with another heterogeneous database system and independent of underlying legacy systems.

3. The one or more non-transitory computer-readable storage media of claim 1, wherein the selecting of the at least one report includes dynamic selection of the at least one report over different predetermined time periods.

4. The one or more non-transitory computer-readable storage media of claim 3, wherein the acts further comprising:

identifying a threshold to select the at least one report from the plurality of reports;

comparing an identified threshold to a corresponding feature of each report; and selecting the at least one report based at least upon a comparison between the identified threshold and the corresponding one of the one or more features of the selected report.

5. The one or more non-transitory computer-readable storage media of claim 1, wherein the DApp includes a business logic that:

identifies a format of the data on the DLT blockchain; and generates a dataset to be posted to the DLT blockchain based upon an identified format of the data on the DLT blockchain.

6. The one or more non-transitory computer-readable storage media of claim 1, wherein the DApp includes a business logic that implements the smart contract as a just-in-time smart contract.

7. The one or more non-transitory computer-readable storage media of claim 1, wherein the DApp includes a business logic that authenticates a completion of conditions and preconditions that are required for generating an analytics report.

8. The one or more non-transitory computer-readable storage media of claim 1, wherein the ported data are not normalized prior to the posting to the DLT blockchain.

9. The one or more non-transitory computer-readable storage media of claim 1, wherein the database driver is configured to perform the selection of the at least one report periodically.

10. The one or more non-transitory computer-readable storage media of claim 1, wherein the DApp is configured to run for a predetermined time period.

11. A system, comprising:
one or more processors; and
memory including a plurality of computer-executable components that are executable by the one or more processors to perform a plurality of actions, the plurality of actions comprising:

selecting, by a database driver, at least one report from a plurality of reports based on one or more features of the at least one report;

subscribing, by the database driver, to a legacy event trigger that is associated with the selected at least one report;

receiving a triggering event from a legacy database;

in response to receiving the triggering event, querying the legacy database for data to include in identifiable data fields of the legacy database in the selected report that are predetermined to receive the data;

mapping the data fields into data fields of a smart contract;

porting, by the database driver, the data that is associated with the triggering event as inputs to the mapped fields of the smart contract;

verifying, by a decentralized application (DApp), the ported data; and posting, by the DApp, the verified data to a distributed ledger technology (DLT) blockchain.

12. The system of claim 11, wherein the reports are associated with a heterogeneous database system that is integrated with another heterogeneous database system and independent of underlying legacy systems.

13. The system of claim 11, wherein the selecting of the at least one report includes dynamic selection of the at least one report over different predetermined time periods.

14. The system of claim 13, wherein the plurality of actions further comprise:

identifying a threshold to select the at least one report from the plurality of reports;

comparing an identified threshold to a corresponding feature of each report; and selecting the at least one report based at least upon a comparison between the identified threshold and the corresponding one of the one or more features of the selected report.

15. The system of claim 11, wherein the DApp includes a business logic that:

identifies a format of the data on the DLT blockchain; and generates a dataset to be posted to the DLT blockchain based upon an identified format of the data on the DLT blockchain.

16. The system of claim 11, wherein the DApp includes a business logic that implements the smart contract as a just-in-time smart contract.

17. The system of claim 11, wherein the DApp includes a business logic that authenticates a completion of conditions and preconditions that are required for generating an analytics report.

18. A computer-implemented method, comprising:

subscribing, by a database driver, to triggering events associated with a plurality of reports;

receiving a triggering event from a legacy database;

in response to receiving the triggering event, querying the legacy database for data to include in identifiable data fields of the legacy database in the selected report that are predetermined to receive the data;

mapping the data fields into data fields of a smart contract;

porting, by the database driver, the data that is associated with the triggering event as inputs to the mapped fields of the smart contract;

verifying, by a decentralized application (DApp), the ported data; and posting, by the DApp, the verified data to a distributed ledger technology (DLT) blockchain.

19. The computer-implemented method of claim 18, wherein the reports are associated with a heterogeneous database system that is integrated with another heterogeneous database system and independent of underlying legacy systems.

20. The computer-implemented method of claim 18, wherein the DApp includes a business logic that authenticates a completion of conditions and preconditions that are required for generating an analytics report.

\* \* \* \* \*